United States Patent [19]
Sanderson

[11] Patent Number: 5,864,284
[45] Date of Patent: *Jan. 26, 1999

[54] APPARATUS FOR COUPLING RADIO-FREQUENCY SIGNALS TO AND FROM A CABLE OF A POWER DISTRIBUTION NETWORK

[76] Inventor: Lelon Wayne Sanderson, 55 Spray Rd., Fayetteville, Tenn. 37334

[ * ] Notice: This patent issued on a continued prosecution application filed under 37 CFR 1.53(d), and is subject to the twenty year patent term provisions of 35 U.S.C. 154(a)(2).

[21] Appl. No.: 812,793
[22] Filed: Mar. 6, 1997
[51] Int. Cl.$^6$ .................................................. H04M 11/04
[52] U.S. Cl. .............................. 340/310.01; 340/310.05; 340/310.06; 455/3.3; 375/259
[58] Field of Search ........................ 340/310.01, 310.02, 340/310.03, 310.04, 310.05, 310.06, 310.07, 310.08; 455/3.3; 375/259

[56] References Cited

U.S. PATENT DOCUMENTS

| | | | |
|---|---|---|---|
| 4,142,178 | 2/1979 | Whyte et al. | 340/310.01 |
| 4,361,202 | 11/1982 | Minovitch | 180/168 |
| 4,471,399 | 9/1984 | Udren | 361/64 |
| 4,668,934 | 5/1987 | Shuey | 340/310.01 |
| 4,851,832 | 7/1989 | Graf | 340/907 |

*Primary Examiner*—Nina Tong
*Attorney, Agent, or Firm*—Curtis W. Dodd

[57] ABSTRACT

A coupling system for transferring a RF signal to and from a high-voltage cable (302) of a power distribution system is described. In one embodiment the coupling system uses a lightning arrester (314) as an element for coupling a RF signal from a RF modem (420) to and from the high-voltage cable. An impedance element of the coupling system is a section of a grounding cable (309) modified with one or more ferrite cores (430) as a means for adjusting the value of the impedance.

12 Claims, 2 Drawing Sheets

APPARATUS FOR COUPLING RADIO-FREQUENCY SIGNALS TO AND FROM A CABLE OF A POWER DISTRIBUTION NETWORK

FIELD OF THE INVENTION

This application relates to coupling radio-frequency signals to and from a high-voltage cable of a power distribution network, while the distribution network is supplying electrical power. The radio-frequency signals may be used for a variety of communication applications such as high-speed data transfers.

BACKGROUND OF THE INVENTION

As demand for information services has increased over the last decade, the technology to meet the demand has increased accordingly. Approximately ten years ago a modem, typically a commercial product, provided data transfer rates of around 2.4 kilobits per second ("KBPS") over analog telephone lines. Currently high-speed modems and ISDN terminal adapters coupled over a public switched telephone network provide data transfer rates of between 28.8 and 128 KBPS for both commercial and residential customers. Internet service providers are currently seeking technology that will furnish customers with faster transfer rates for reducing download time. In addition the evolution of digital television and other video developments has increased the demand for higher data transfer rates, such as a megabits per second ("MBPS") transfer rate. These higher data transfer rates are sometimes called "broadband service" or MBPS service. The MBPS service typically provides for both upstream and downstream data transfer and may be referred to as interactive broadband service ("IBS").

The 1996 Telecommunications Deregulation Act allows a variety of providers to compete for IBS. The providers currently considered as leaders in meeting the IBS needs of consumers include long distance carriers, local carriers and cable companies. In order to provide IBS, resource sharing and partnerships may develop among a variety of businesses.

There are currently four technologies being considered as contenders to provide IBS or similar service. These technologies include techniques for using the existing twisted pairs of wires in the current telephone network, coaxial cables, fiber links, and wireless links. A detailed discussion of these technologies can be found in IEEE Network Magazine, Special Issue on Broadband Services to the Home, Vol. 11, No. 1, January/February, 1997. Each of these technologies shows promise towards providing IBS, but each technology has technical problems and economic constraints. An access network that can provide for a complex mix of broadband services such as a high-speed internet connection, video on demand, telecommuting, and future applications is currently being developed incorporating these four technologies. Selection of the best or optimum technology is dependent on a variety of parameters such as the infrastructure of a country, the physical environment for a new installation, the demographic diversity of users and other factors.

Although the above four technologies are expected to provide IBS to a large number of subscribers, the use of a power system network may be capable of serving as an IBS technology. Currently a partnership exists between local telephone service providers and power companies. In a typical residential location a support pole or telephone pole is used as part of the structure for providing for getting both power lines and telephone lines to a customer. Cable television ("CATV") providers recently joined the partnership in order to have poles to support coaxial cables. Because of recent asymmetric digital subscriber line development, some local telephone companies may be able to deliver television programming over existing and new telephone lines. Further it has been discovered that part of the excess bandwidth on television cables of CATV companies can be used to provide telephone and data service.

As power companies look for new sources of revenue and demands for data bandwidth increase, the use of power system networks may be a means for providing IBS. Currently, existing power line communication systems are limited to low data rates which are used for monitoring and controlling functions in the power system network. These existing systems are called power line carrier communication systems. Power line carrier communications systems use conventional high-voltage transformers to couple communications signals to and from the high-voltage lines of a power system. The high-voltage transformers are expensive and typically limited to coupling signals having frequencies between 30 hertz and 50 kilohertz. Because of cost and bandwidth limitations, power line carrier communication systems are not suitable for IBS.

In order to use high-voltage lines for IBS there are a variety of problems to consider. For a power line to provide high-speed data service there must be an apparatus and method for efficiently coupling radio-frequency signals to the high-voltage cables of the power network. Further the apparatus and method should not compromise the performance of the existing power system and must have a means to isolate the low-voltage electronic components required to process radio-frequency signals transporting data. In addition such a coupling apparatus must be inexpensive, small, environmentally acceptable, essentially maintenance free and easy to install.

DESCRIPTION OF THE PREFERRED EMBODIMENT

Figure 1:
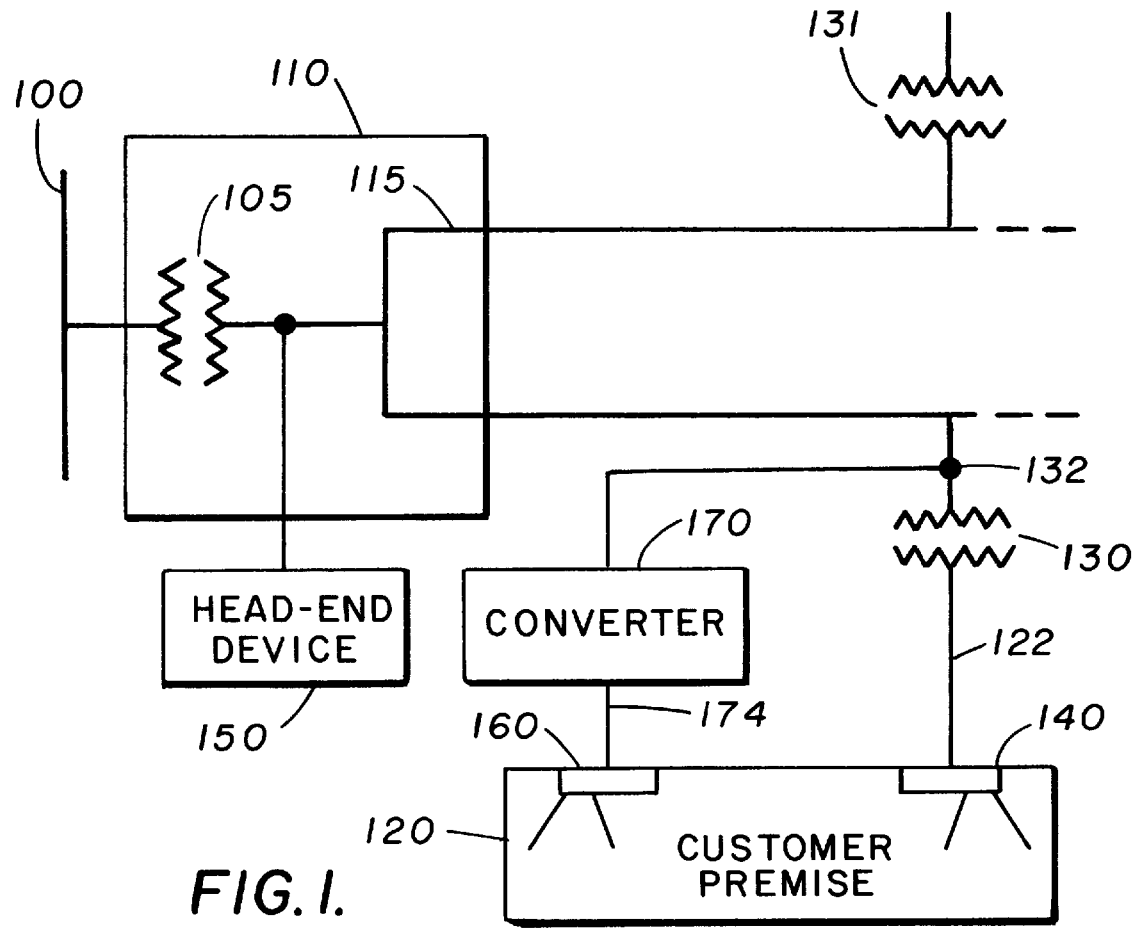
FIG. 1 is a schematic of a power distribution network and a radio-frequency system in accordance with the present invention.

An electrical power network is comprised of generators, transformers, transmission lines, and other components. A power distribution network is a part of an electrical power network that couples electrical energy to customers. FIG. 1 illustrates a power distribution network having additional components serving to provide for two-way high-speed data transfers. A transmission network 100 furnishes a transmission voltage, typically 69 Kilovolts ("KV") or greater, to a transmission transformer 105, at a distribution substation 110, for converting the transmission voltage to a distribution voltage, typically around 4 to 15 KV. The distribution voltage is then distributed as electrical energy over distribution cables 115 to a customer premise 120. The distribution cables are typically three cables, where each cable has one phase of a three phase voltage system. Each phase of the distribution voltage is reduced to approximately 120 volts by the step-down action of a distribution transformer 130 for delivery to the customer premise. The voltage at the customer premise, such as a residence, is typically a three-wire single phase voltage and is coupled to the customer premise over a residential cable having three electrical wires 122. The voltage delivered over the three electrical wires 122 is coupled to a distribution box 140. The distribution box has circuit breakers and terminals for distributing electrical power within the residence. The sole use of the power distribution network, not having the additional elements, is to deliver electrical power to the customer premise.

Still referring to FIG. 1, there is shown a head-end device 150 coupled to a gateway 160 by a converter 170. A converter cable 174 and the distribution cable 115 are elements in the coupling. The converter cable 174 may be an optical fiber, a coaxial cable, a twisted pair or other conductors. The head-end device 150 transmits and receives radio-frequency ("RF") signals to and from the gateway 160. When the RF signals are modulated with data using modem techniques the head-end device 150 and the gateway 160 serve as components of an interactive broadband system ("IBS"). Elements connected within the customer premise 120 to the gateway 160 may include a telephone, a computer, a television, a security system and other such devices. The types of services that may be delivered over the IBS are numerous and have been described in public literature, such as trade magazines, technical society journals, internet sites, and other sources. It is the objective of the present invention to provide a communication system that meets existing and future communication needs of IBS providers and customers. Another objective of the present invention is to provide an IBS that efficiently uses elements of the power system as elements of a communications system. Still another object of the present invention is to provide a system that is expandable without the requirement of installing coaxial cable, fiber, or other transmission channel elements.

The system for providing data communication service to the customer premise as shown in FIG. 1 may be modified to provide station-to-station communications for internal use of a power company. In addition the data communication system of the present invention may serve as part of a control and monitoring system for a power network or power grid. In order for the system to provide data communications functions for the power industry additional system elements may be needed, such as blocking elements to cancel the interference problems in a hub arrangement and RF repeaters to boost signal levels.

Figure 2:
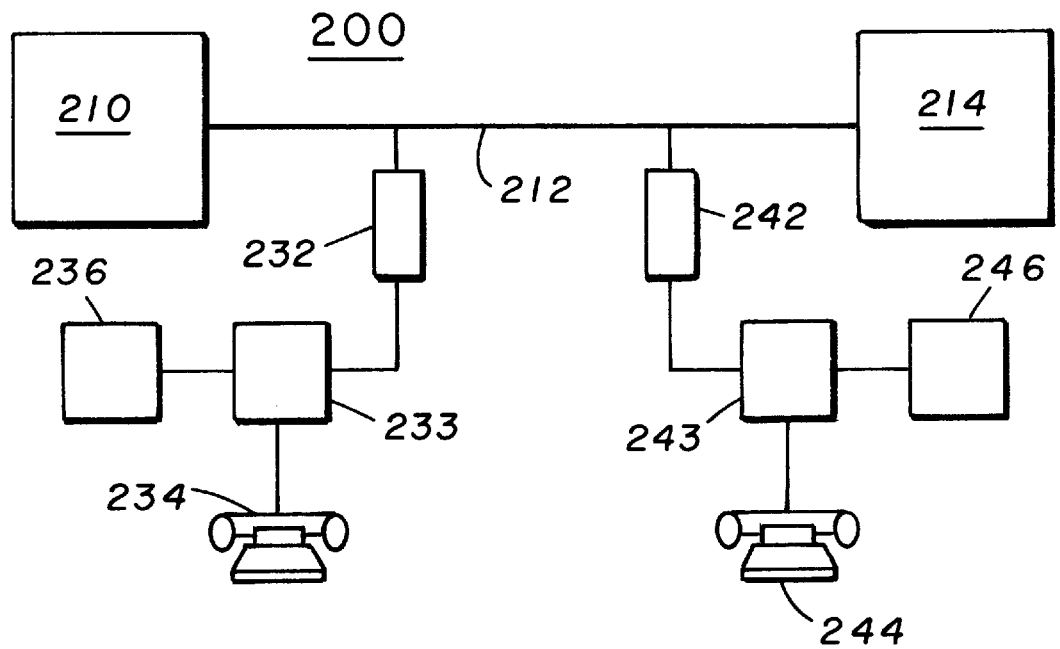
FIG. 2 is a representation of a prior art communications system using the power network.

FIG. 2 illustrates a power network communication system 200, a prior art apparatus, that provides phone and data transfer services. The power network communication system 200, typically referred to as a power line carrier system is used to transfer data between a local station 210, using a power cable 212, and a remote station 214. The data rates between the local station 210 and remote station 214 of the power line carrier system are low compared to the rates for providing IBS. A local coupling device 232 and a remote coupling device 242 each have a high-voltage terminal connected to the high-voltage power cable 212. A second terminal of the coupling devices 232, 242 are connected to a local transceiver 233 and a remote transceiver 243. The combination of the transceivers, coupling devices, and power cable provide a low-frequency signal communication system for a telephone connection and an instrument connection. The telephone connection is provided using a local telephone 234 and a remote telephone 244. A local monitor and control device 236 can transfer and receive information from a remote monitor and control device 246. Power line carrier systems have been used by the power industry for over thirty years and have served to provide for voice communications and low data rate applications.

The coupling devices 232, 242 are typically low-frequency transformers typically passing signals between 30 Hertz and 50 Kilohertz. The low-frequency transformers are designed for isolating and protecting personnel and equipment from any overvoltages or high voltage transients that may be present on the high-voltage cables. Because the power line carrier system has met most of the communications and control needs of the power industry there has been little incentive for increasing the bandwidth of such systems. In power system networks requiring higher data bandwidths, power companies have chosen other data transfer means, such as microwave links, dedicated fiber optics, coaxial cables or leased lines.

Figure 3:
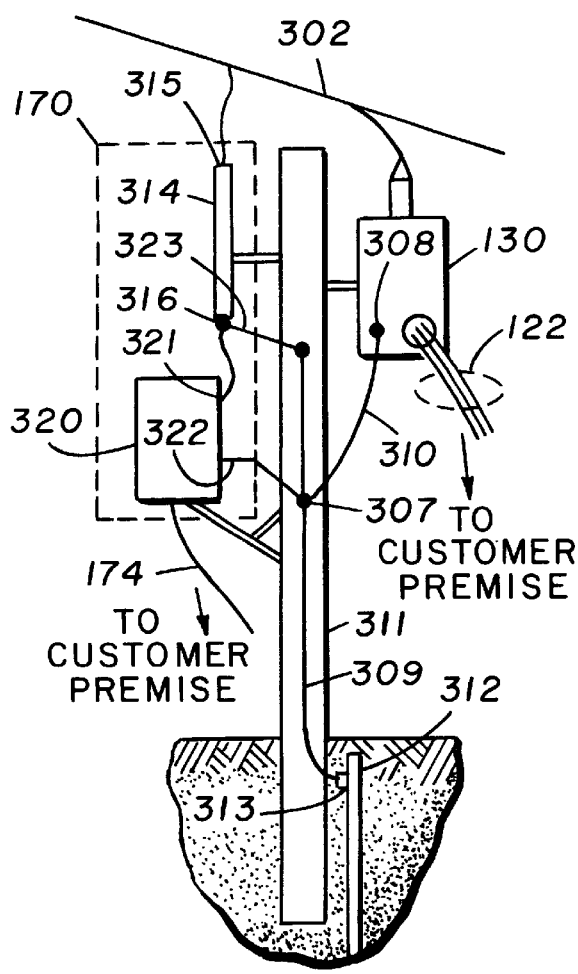
FIG. 3 is an illustration of a coupler in accordance with the present invention.

The converter 170 for providing broadband services is illustrated in FIG. 3. The converter is used to transfer a RF signal, typically having frequencies in a one to sixty Megahertz range, between the head-end device 150 and the gateway 160. The range of frequencies for RF signals of the present invention may be in various regions of the VHF and UHF bands. A high-voltage cable 302 of the distribution cable 115 is coupled to a single phase distribution transformer 130. The distribution transformer provides single phase, 3 wire power for residential service using power wires 122. A transformer grounding terminal 308 is coupled to a grounding wire 309 by a heavy gauge copper wire 310. The point where the grounding wire 309 and the transformer grounding wire 310 are coupled is called the neutral node 307. The grounding wire 309 is secured to a support pole 311 and is attached to a grounding rod 312 at the bottom of the support pole. The point where the grounding wire 309 and the grounding rod 312 are coupled is referred to as the ground node 313. All the elements described above are part of a typical electrical connection for providing electrical service to a customer premise 120.

Also connected to the high-voltage cable 302 is a lightning arrester 314. The high-voltage terminal of the arrester 315 is connected to the high-voltage cable 302 by an electrical conductor, such as a piece of copper wire. The grounding node of the arrester 316 is connected to the grounding conductor 309 by another conductor 323, such as a piece of copper wire. An RF signaling device 320 has an RF output terminal 321 coupled to the grounding node of the arrester 316. A RF reference node 322 of the RF signaling device 320 is connected to the neutral node 307. A head-end device RF transmitted signal is coupled to the RF device 320 using the RF impedance characteristics of the arrester. Although arresters are typically placed on power poles for lightning protection, the capacitance of the arrester is large enough to couple an RF signal. It has been determined that the capacitance of an arrester typically has values between 1 picofarad and 170 picofarads. The wide range of values for the capacitance of an arrester is due to the variety of manufacturing techniques and structures.

Figure 4:
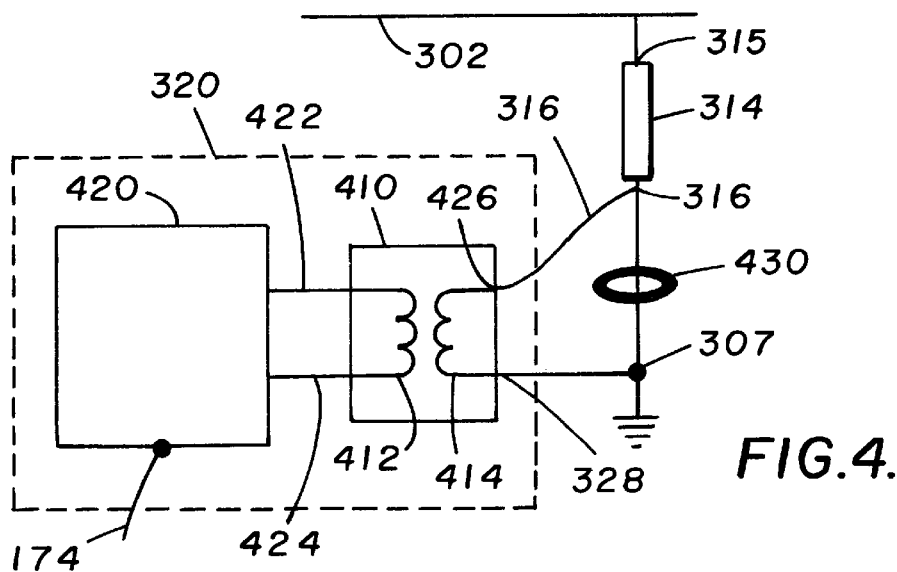
FIG. 4 is a detailed illustration of an embodiment of a radio-frequency coupler in accordance with the present invention.

FIG. 4 illustrates the structure for coupling the RF signaling device 320 to the high-voltage cable 302. The RF signaling device is comprised of a RF modem 420 coupled to a RF transformer 410. A first coupling wire 422 and a second coupling wire 424 connect the RF modem to a primary winding 412 of the RF transformer. A secondary winding 414 of the RF transformer has an output terminal 426 connected to the low-voltage terminal of the arrester 316 and a neutral terminal 428 connected to the neutral node 307. In order to increase the RF impedance on the piece of grounding cable 309 between the low-voltage terminal of the arrester 316 and the neutral node 307, a ferrite core 430 may be placed around the grounding cable. Neither the ferrite core 430 nor the RF transformer 410 is required in order to couple the RF modem 420 to the arrester 315 in accordance with the present invention. However the RF transformer does serve as protection mechanism by providing an alternate path to ground if ground cable 309 is disconnected. In addition the RF transformer may provide impedance matching. Although the arrester 314 is used as an element in the coupling apparatus of the present invention, the use of a high-voltage capacitor or other high-voltage RF coupler, such as an adaptive coupler, could serve in place of the arrester. The RF couplers of the present invention will pass high-frequency signals, but will block low-frequency signals, thereby providing low-frequency isolation. An electrical circuit equivalent of the coupling arrangement of FIG. 4 is shown in FIG. 5.

Because arresters are considered to be a large impedance to any signal normally found on the high-voltage cable 302, the inventor believes that this novel use of the arrester is unique. In addition the inventor believes that a modified lightning arrester could be developed which could serve as an arrester and an RF coupler. Such a modified lightning arrester would result in a novel electrical element having improved coupling characteristics, but could be fabricated or manufactured using methods similar to those used in making existing lightning arresters. It is also not obvious that the grounding cable 309, a low impedance to typical power system voltages, may serve as an impedance element for a RF coupling circuit. Because the components of the present invention are installed on existing power distribution networks it may be necessary to add ferrite cores or similar elements to adjust RF impedances. This adjusting of RF impedances is necessary to obtain satisfactory RF coupling.

In addition to receiving RF signals from the head-end device 150, the RF modem 420 may also transmit a modem transmit signal. The modem transmit signal is coupled through the RF transformer 410, the lightning arrester 314, and the high-voltage cable 302 to the head-end device 150. The modem transmit signal is used to transfer information to the head-end device 150 from the customer premise. Because the converter 170 transfers RF signals, modulated with data, in both directions, the present invention may be used to provide IBS.

Figure 5:
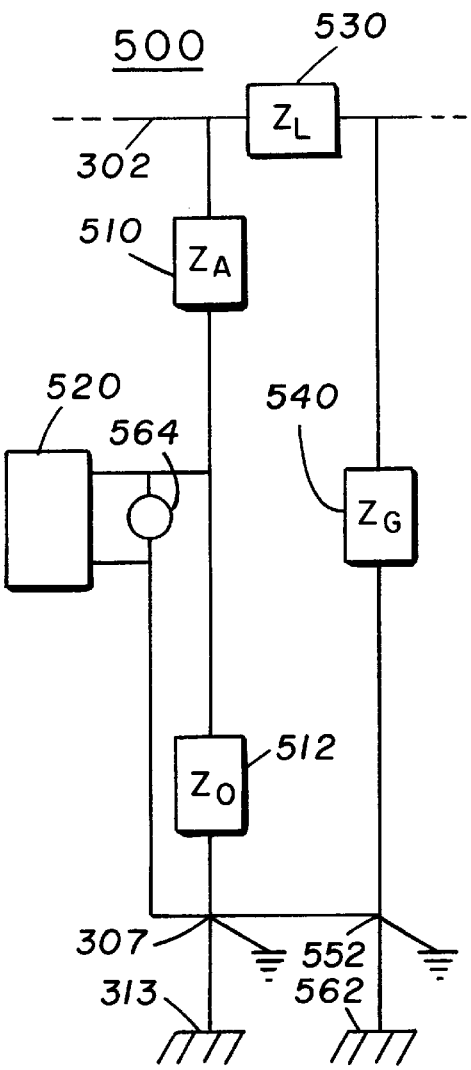
FIG. 5 is an equivalent circuit an embodiment of a radio-frequency coupler in accordance with the present invention.

An equivalent circuit 500 of an embodiment of an RF coupling circuit in accordance with the present invention is illustrated in FIG. 5. A translated RF modem 520 is an equivalent of the RF modem 420 transformed to the secondary of the RF transformer. The output impedance, $Z_O$, 512 is the impedance between the bottom of the arrester and the neutral node 307. An arrester impedance, $Z_A$, 510 is the equivalent impedance of the arrester to an RF signal. The line impedance, $Z_L$, 530 represents the impedance of the high-voltage cable 302 to an RF signal. Connected to one side of the line impedance is a ground impedance, $Z_G$, 540 representing RF impedance to ground. The neutral node 307 is coupled to a remote neutral node 552. The ground node 313 is coupled to a remote ground node 562 by grounding rods driven in the earth. A gas discharge tube 564 is placed across the terminals of the translated RF modem 520 as a safety device to warn of a faulty circuit. The gas discharge tube acts as an open circuit unless an overvoltage appears across the terminals of the output impedance 512.

When an incoming RF signal from the head-end device 150 is placed on the high-voltage cable 302, $Z_A$ and $Z_O$ serve as a voltage divider circuit. Hence a portion of the RF signal on the high-voltage cable is coupled to the translated RF modem 520. Since only a portion of the incoming RF signal is received by the translated RF modem other converters may receive the RF signal. When the translated RF modem 520 transmits a modem transmit signal, $Z_A$ and the combination of $Z_L$ and $Z_G$ act as a voltage divider allowing a portion of the modem transmit signal to be received by the head-end device 150. The output impedance, $Z_O$, 512 serves as a driving point impedance when the RF modem transmits a signal. The equivalent circuit of $Z_O$ to an RF signal may be a few microhenries in series with 10 to 30 ohms. Although it is difficult to model $Z_A$, an equivalent impedance of 1 to 150 picofarads in parallel with several megaohms is a workable engineering approximation. The equivalent impedance of both $Z_L$ and $Z_G$ may have a very wide range of values, depending on the length of the line and the location and number of distribution connections. In addition to wide variations in the impedances of the equivalent circuit due to the distribution network structure, environmental conditions, such as temperature and humidity may also cause these impedances to change. The equivalent circuit 500 as illustrated in FIG. 5 may be used by those skilled in the art, applying mesh or nodal analysis in conjunction with transmission line equations, to determine the transmission characteristics of the IBS provided by the present invention.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims:

We claim:

1. A radio frequency injection system for inserting a radio frequency signal onto a high-voltage cable of a power distribution system where the power distribution system has a neutral wire connected between a neutral node and a remote neutral node, the radio frequency injection system comprising:

a radio frequency transmitter having an output terminal with a radio frequency transmit signal, radio frequency transmitter further having a neutral terminal connected to the neutral node;

a radio frequency coupler having a high-voltage terminal and a low-voltage terminal, where the high-voltage terminal is coupled to the high-voltage cable and the low-voltage terminal is connected to the output of the radio frequency transmitter for receiving the radio frequency transmit signal;

a copper wire mounted on a pole serves as an output impedance having one end connected to the low-voltage terminal of the radio frequency coupler and having the other end connected to the neutral node; and a low radio frequency impedance path between the neutral note and the remote neutral node where the low radio frequency impedance serves as a return path for the radio frequency signal, wherein said low radio frequency impedance path is the neutral wire; and wherein the radio frequency signal couples frequencies between one Megahertz and two hundred Megahertz.

2. The radio frequency injection system of claim 1, wherein the radio frequency coupler is a lightning arrester.

3. The radio frequency injection system of claim 1, wherein the radio frequency coupler is a high-voltage capacitor.

4. The radio frequency injection system of claim 1, wherein the radio frequency signal is modulated with data.

5. In a data communication system having a high-voltage cable for coupling a radio frequency signal onto the high-voltage cable, said system comprising:

a radio frequency transmitter with an output terminal and a reference terminal with the reference terminal connected to a neutral node, the radio frequency transmitter including the radio frequency signal;

a radio frequency coupler having a high-voltage terminal coupled to the high-voltage cable, the radio frequency coupler further having a low-voltage terminal coupled to the output terminal of the transmitter;

a copper wire mounted on a pole serves as an output impedance having a first terminal and a second terminal, where the first terminal is connected to the low-voltage terminal of the radio frequency coupler and the second terminal is connected to the neutral node;

a low radio frequency impedance path between the neutral node and a remote neutral node where the low radio frequency impedance serves as a return path for the radio frequency signal; and wherein said low radio frequency impedance path is a neutral wire of a power distribution system connected between the neutral node and the remote neutral node;

a high radio frequency impedance path between the neutral node and earth ground;

wherein the radio frequency signal has frequencies between one Megahertz and two hundred Megahertz.

6. The system of claim 5, wherein the radio frequency coupler is a lightning arrester.

7. The system of claim 5, wherein the radio frequency coupler is a high-voltage capacitor.

8. The system of claim 5, wherein the output impedance is a section of grounding cable having ferrite cores.

9. In a data communication system having a high-voltage cable for coupling a radio frequency signal onto an input terminal of a radio frequency receiver, said system comprising:

a radio frequency transmitter with the radio frequency signal;

the radio frequency receiver with the input terminal and a reference terminal with the reference terminal connected to a neutral node;

a radio frequency coupler having a high-voltage terminal coupled to the high-voltage cable, the radio frequency coupler further having a low-voltage terminal coupled to the input terminal of the receiver;

a copper wire mounted on a pole serves as an output impedance having a first terminal and a second terminal, where the first terminal is connected to the low-voltage terminal of the radio frequency coupler and the second terminal is connected to the neutral node;

a low radio frequency impedance path between the neutral node and a remote neutral node at the radio frequency source, where the low radio frequency impedance serves as a return path for the radio frequency signal; and wherein said low radio frequency impedance path is a neutral wire of a power distribution system connected between the neutral node and the remote neutral node;

wherein the radio frequency signal has frequencies between one Megahertz and two hundred Megahertz.

10. The system of claim 9, wherein the radio frequency coupler is a lightning arrester.

11. The system of claim 9, wherein the radio frequency coupler is a high-voltage capacitor.

12. The system of claim 9, wherein the output impedance is a section of grounding cable having ferrite cores.

* * * * *